(12) United States Patent
Hagiwara et al.

(10) Patent No.: US 10,419,136 B2
(45) Date of Patent: Sep. 17, 2019

(54) COMMUNICATION DEVICE AND ORTHOGONAL ERROR MEASUREMENT METHOD FOR COMMUNICATION DEVICE

(71) Applicant: Kabushiki Kaisha Toshiba, Minato-ku, Tokyo (JP)

(72) Inventors: Yousuke Hagiwara, Kawasaki Kanagawa (JP); Yuki Fujimura, Ota Tokyo (JP); Hiroyuki Kobayashi, Yokohama Kanagawa (JP); Ichiro Seto, Fuchu Tokyo (JP); Shigehito Saigusa, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 59 days.

(21) Appl. No.: 15/700,659

(22) Filed: Sep. 11, 2017

(65) Prior Publication Data
US 2018/0183531 A1 Jun. 28, 2018

(30) Foreign Application Priority Data
Dec. 27, 2016 (JP) .................... 2016-253713

(51) Int. Cl.
*H04B 17/309* (2015.01)
*H04L 7/00* (2006.01)
*H04B 17/00* (2015.01)
*H04L 27/00* (2006.01)

(52) U.S. Cl.
CPC ....... *H04B 17/309* (2015.01); *H04B 17/0085* (2013.01); *H04L 7/0054* (2013.01); *H04L 27/00* (2013.01)

(58) Field of Classification Search
CPC .. H04B 17/309; H04B 17/0085; H04L 7/0054
See application file for complete search history.

(56) References Cited

U.S. PATENT DOCUMENTS

| 5,870,668 A * | 2/1999 | Takano | H03D 7/168 455/126 |
|---|---|---|---|
| 6,400,318 B1 * | 6/2002 | Kasami | H01Q 3/2605 342/372 |
| 8,693,594 B2 | 4/2014 | Yoshida | |
| 2005/0197078 A1 * | 9/2005 | Yoshimoto | H04B 1/406 455/127.4 |

(Continued)

FOREIGN PATENT DOCUMENTS

| JP | 07-321686 A | 8/1995 |
|---|---|---|
| JP | 08-008775 A | 1/1996 |

(Continued)

*Primary Examiner* — Min Jung
(74) *Attorney, Agent, or Firm* — White & Case LLP

(57) ABSTRACT

According to an embodiment, a communication device includes a phase-shifting circuit that shifts a phase of a local signal and supplies it to an orthogonal demodulator. The phase-shifting circuit includes first and second signal input ends that are supplied with an output signal of a local oscillator between both ends thereof, a frequency divider that has first and second input ends, and a switching part that is provided between the first and second signal input ends and the first and second input ends of the frequency divider and switches connection between the first and second signal input ends and the first and second input ends of the frequency divider.

20 Claims, 7 Drawing Sheets

(56) References Cited

U.S. PATENT DOCUMENTS

2008/0025435 A1 1/2008 Yamaguchi et al.
2013/0163656 A1* 6/2013 Sakamoto ............ H04L 27/364
 375/226

FOREIGN PATENT DOCUMENTS

JP 4172805 B2 10/2008
JP 2013-120957 A 6/2013

* cited by examiner

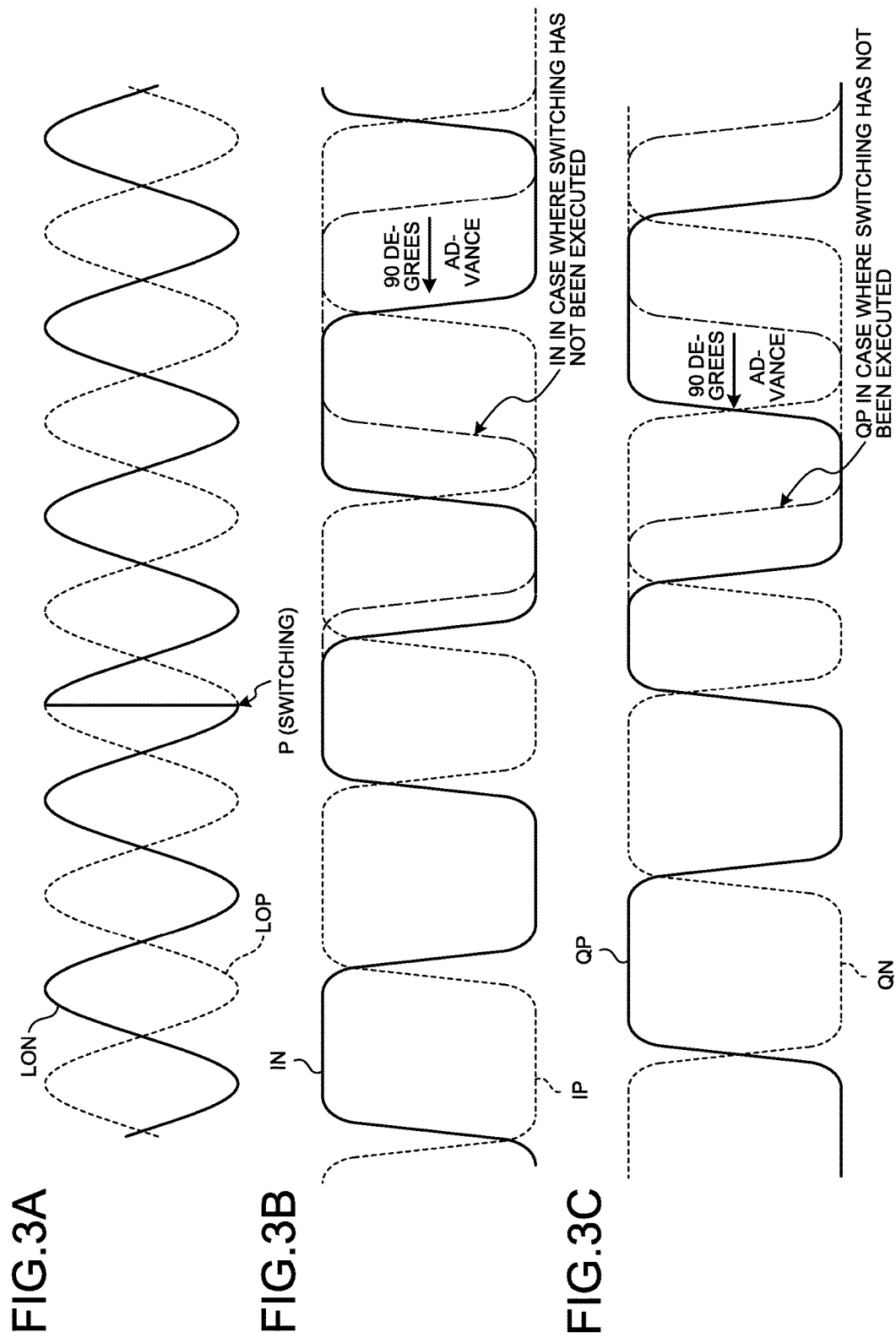

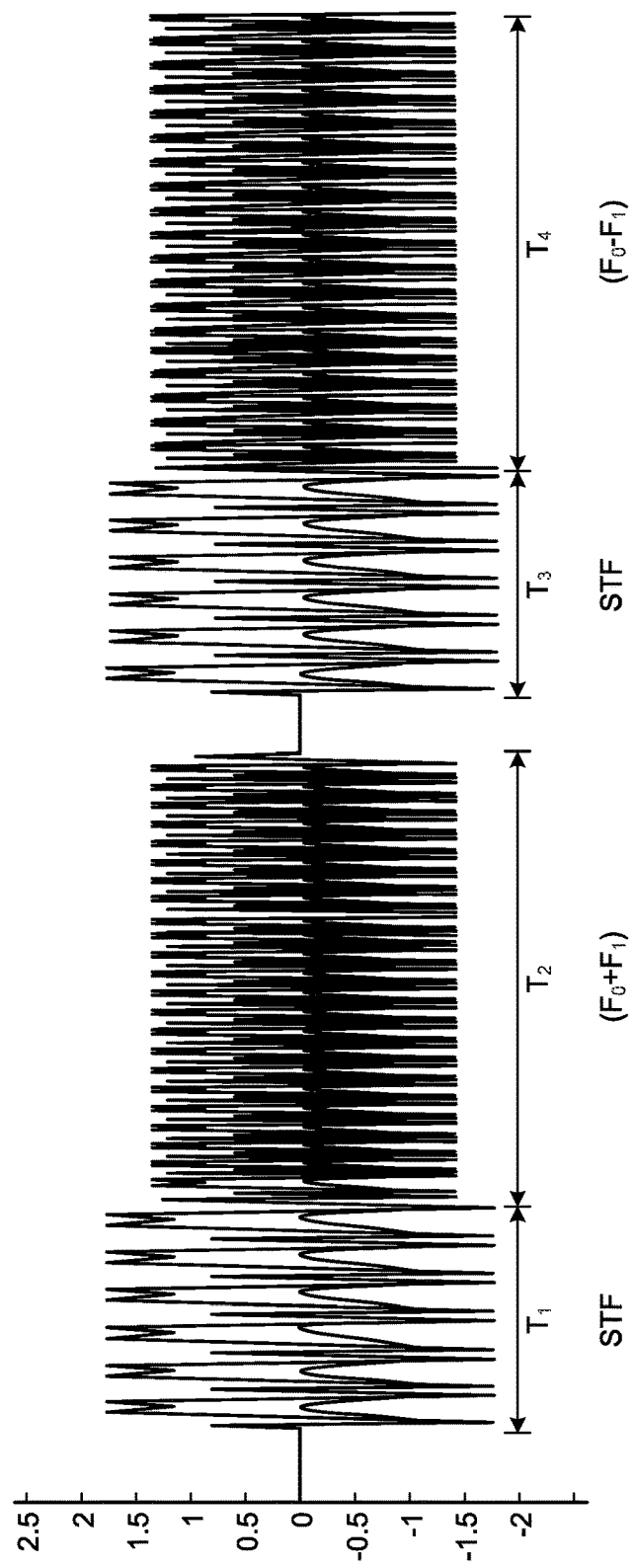

COMMUNICATION DEVICE AND ORTHOGONAL ERROR MEASUREMENT METHOD FOR COMMUNICATION DEVICE

CROSS-REFERENCE TO RELATED APPLICATIONS

This application is based upon and claims the benefit of priority from Japanese Patent Application No. 2016-253713, filed on Dec. 27, 2016; the entire contents of which are incorporated herein by reference.

FIELD

The present embodiment relates to a communication device and an orthogonal error (IQ imbalance) measurement method for a communication device.

BACKGROUND

A technique of a communication device that includes an orthogonal modulator and an orthogonal demodulator is conventionally disclosed wherein a loop back path that supplies an output of the orthogonal modulator to the orthogonal demodulator is provided and errors of the orthogonal modulator and the orthogonal demodulator are separated by using results of measurement in a case where in-phase local signals are supplied to the orthogonal modulator and the orthogonal demodulator and a case where local signals that have a predetermined phase difference are supplied thereto, so as to compensate for an orthogonal error (a gain error, a phase error, a direct current offset, or the like).

In a case where a phase shift circuit that provides a phase difference to local signals that are supplied to an orthogonal modulator and an orthogonal demodulator is configured by using, for example, an RC filter, gain reduction involved with a phase shift is caused, and hence, an amplitude of a local signal that is supplied to such an orthogonal demodulator varies between before and after such a phase shift to influence an orthogonal error. Therefore, a phase shift circuit is desired where a change of an amplitude of a local signal that is supplied to an orthogonal demodulator between before and after a phase shift is small. Furthermore, in a case where an image signal that is generated from an orthogonal error is eliminated, an image signal component is suppressed by passing through a loop back path due to a frequency characteristic deviation of such a loop back path, so that detection may be executed in a state different from an original orthogonal error. Therefore, an orthogonal error measurement method is desired that is capable of suppressing an influence of a frequency characteristic deviation of a loop back path.

BRIEF DESCRIPTION OF THE DRAWINGS

FIG. 3A to FIG. 3C are waveform diagrams for a phase shift.

FIG. 7 is a diagram illustrating a configuration example of a test signal.

DETAILED DESCRIPTION

According to an embodiment, a communication device includes a phase-shifting circuit that shifts a phase of a local signal and supplies it to an orthogonal demodulator. The phase-shifting circuit includes first and second signal input ends that are supplied with an output signal of a local oscillator between both ends thereof, a frequency divider that has first and second input ends, and a switching part that is provided between the first and second signal input ends and the first and second input ends of the frequency divider and switches connection between the first and second signal input ends and the first and second input ends of the frequency divider.

Hereinafter, a communication device and an orthogonal error calculation method for a communication device according to an embodiment will be described in detail, with reference to the accompanying drawings. Additionally, the present invention is not limited by such an embodiment.

First Embodiment

Figure 1:
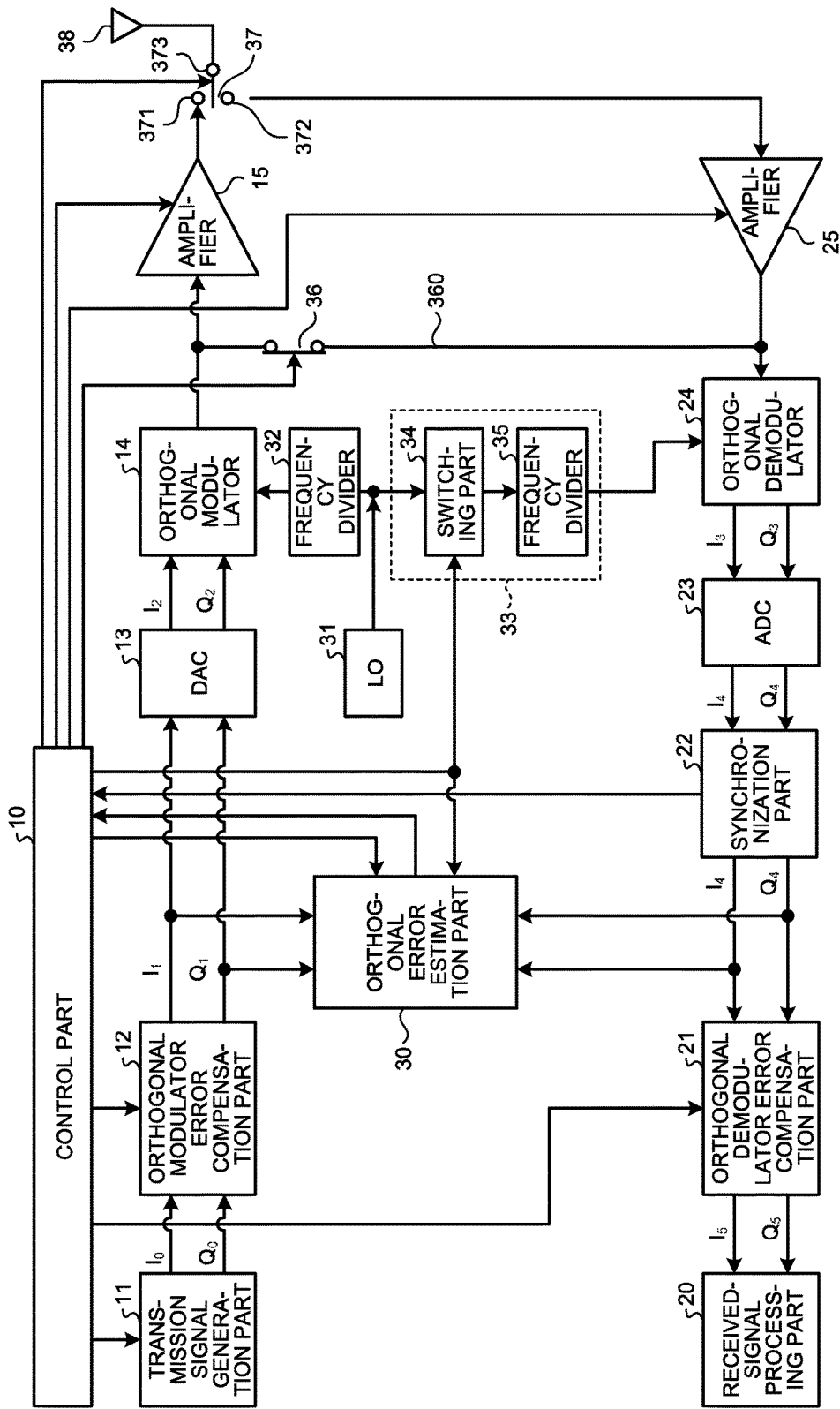
FIG. 1 is a diagram illustrating a configuration of a communication device according to a first embodiment.

FIG. 1 is a diagram illustrating a configuration of a communication device 1 according to a first embodiment. Configurations of a transmission side and a receiving side will be described.

(Configuration of Transmission Side)

The communication device 1 according to the present embodiment has a transmission signal generation part 11 that generates digital orthogonal baseband signals $I_0$ and $Q_0$. Orthogonal baseband signals $I_0$ and $Q_0$ are processed by an orthogonal modulator error compensation part 12, and supplied to a DA converter (DAC) 13 as signals $I_1$ and $Q_1$, respectively.

The DAC 13 converts signals $I_1$ and $Q_1$ into analogue signals and supply them to an orthogonal modulator 14.

The orthogonal modulator 14 modulates signals $I_2$ and $Q_2$ that have been converted into analogue signals, by an output signal of a local oscillator (LO) 31 that is supplied through a frequency divider 32. That is, a signal provided by dividing a frequency of an output signal of the local oscillator 31 is supplied to the orthogonal modulator 14 as a local signal.

An output of the orthogonal modulator 14 is supplied to an amplifier 15. An output of the amplifier 15 is supplied to a terminal 371. The terminal 371 is connected to an output terminal 373 by a switch 37 at a time of signal transmission, so that a transmission signal is delivered from an antenna 38.

(Configuration of Receiving Side)

The output terminal 373 is connected to a terminal 372 by the switch 37 at a time of signal receiving, so that a received signal that has been received by the antenna 38 is supplied to an orthogonal demodulator 24 through an amplifier 25. A switch 36 is turned on at a time of measurement of an orthogonal error, so that an output signal of the orthogonal modulator 14 is supplied to the orthogonal demodulator 24 through a loop back path 360. The loop back path 360 is composed of a wire.

The orthogonal demodulator 24 demodulates each of a received signal that is supplied from the amplifier 25, at a time of signal receiving, and a signal that is supplied from the loop back path 360, at a time of measurement of an orthogonal error, by using a signal that is supplied from a phase shift control part 33, so as to output an I-phase signal $I_3$ and a Q-phase signal $Q_3$.

An AD converter (ADC) 23 coverts an I-phase signal $I_3$ and a Q-phase signal $Q_3$ into digital signals $I_4$ and $Q_4$ and supplies them to a synchronization part 22. The synchronization part 22 holds, for example, a predetermined pattern signal, compares a held pattern signal with an output signal that is supplied from the ADC 23, and in a case where both of them are coincided with one another, supplies a detection signal to a control part 10. The synchronization part 22 is used for detection of a synchronization signal at a time of measurement of an orthogonal error as described later.

The synchronization part 22 does not apply particular processing to digital signals $I_4$ and $Q_4$. Therefore, an output of the synchronization part 22 is also illustrated as digital signals $I_4$ and $Q_4$. Digital signals $I_4$ and $Q_4$ of the synchronization part 22 are supplied to an orthogonal error estimation part 30. The orthogonal error estimation part 30 estimates an orthogonal error from a relationship between signals $I_1$ and $Q_1$ that are supplied from an orthogonal modulator error compensation part 12 and digital signals $I_4$ and $Q_4$ that are supplied from the synchronization part 22. Output signals $I_5$ and $Q_5$ of an orthogonal demodulator error compensation part 21 are supplied to a received-signal processing part 20.

The orthogonal modulator error compensation part 12 and the orthogonal demodulator error compensation part 21 correct orthogonality (an amplitude error, a phase-shifting error, a DC offset, or the like) of a baseband orthogonal digital signal to be input. That is, the orthogonal modulator error compensation part 12 and the orthogonal demodulator error compensation part 21 output signals of an I-phase component and a Q-phase component that are provided by correcting amplitudes, phases, DC offsets, or the like of both components of a baseband orthogonal digital signal to be input. Correction values for the orthogonal modulator error compensation part 12 and the orthogonal demodulator error compensation part 21 are set based on an estimated value of each parameter of an orthogonal error that is estimated by the orthogonal error estimation part 30.

Errors for the orthogonal modulator 14 and the orthogonal demodulator 24 are separated and detected, and hence, it has a phase shift control part 33 that shifts a phase of a local signal that is supplied to the orthogonal demodulator 24. For example, it is possible to separate and calculate errors for the orthogonal modulator 14 and the orthogonal demodulator 24 from an error in a case where there is no phase shift between a local signal that is supplied to the orthogonal modulator 14 and a local signal that is supplied to the orthogonal demodulator 24 and an error in a case where a phase shift of 90 degrees is applied. A method for separating and calculating errors for the orthogonal modulator 14 and the orthogonal demodulator 24 by a phase shift of 90 degrees is described in, for example, Japanese Patent No. 4172805.

The communication device 1 according to the present embodiment has the phase shift control part 33 that controls a phase of a local signal that is supplied to the orthogonal demodulator 24. The phase shift control part 33 has a switching part 34 and a frequency divider 35. A signal provided by dividing a frequency of an output signal of the local oscillator 31 in the frequency divider 35 is supplied to the orthogonal demodulator 24 as a local signal. In a case where a phase shift is applied, a signal that is supplied to the frequency divider 35 is inverted by the switching part 34 and supplied thereto. Thereby, a phase of a signal that is output from the frequency divider 35 is shifted by 90 degrees.

Figure 2:
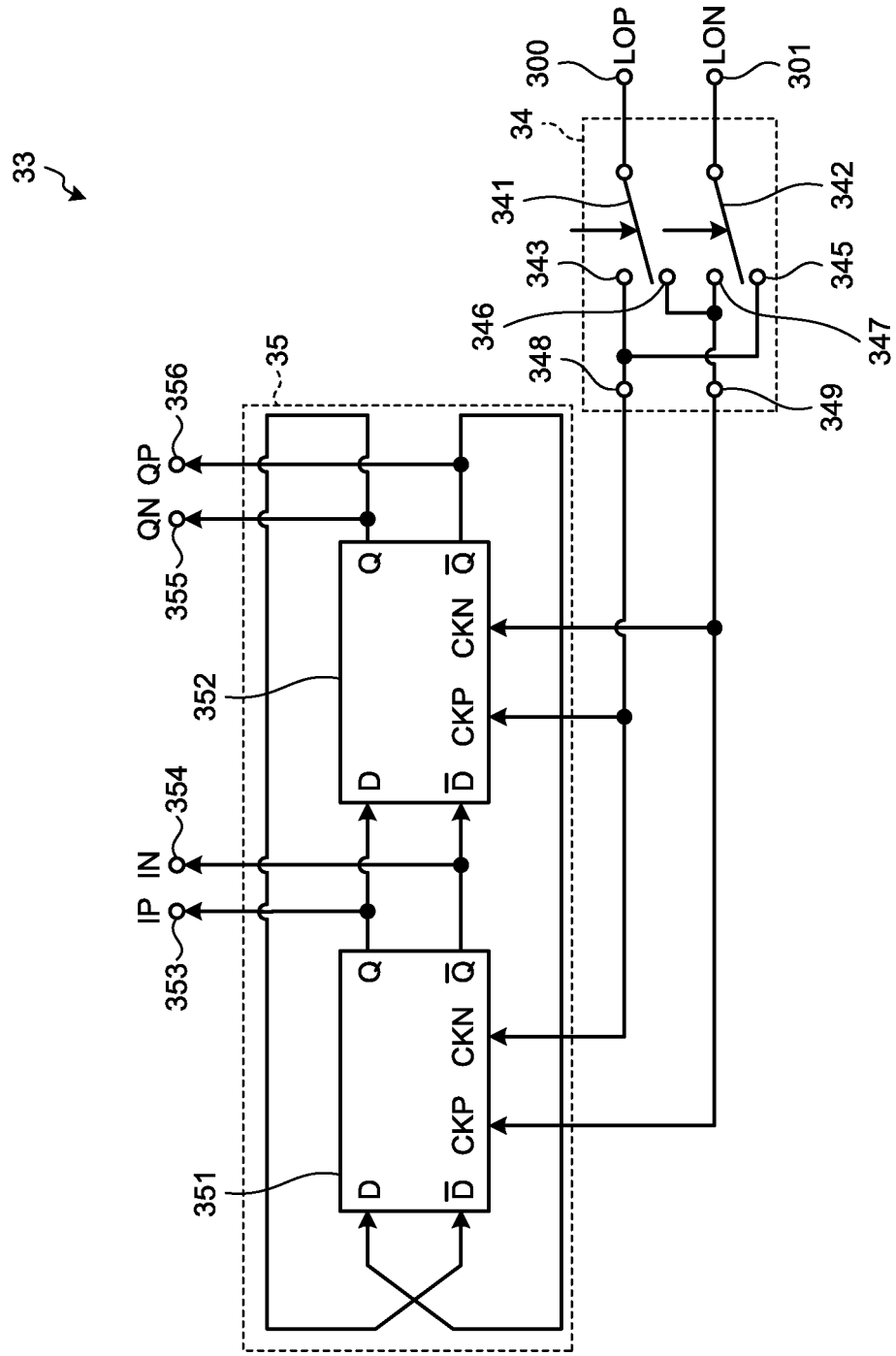
FIG. 2 is a diagram illustrating a configuration example of a phase shift control part.

FIG. 2 is a diagram illustrating a configuration example of a phase shift control part 33. The phase shift control part 33 includes a switching part 34 and a frequency divider 35. The switching part 34 has a pair of input terminals (300, 301). An output signal of the local oscillator 31 is supplied between the pair of input terminals (300, 301). Conveniently, a side of the input terminal 300 and a side of the input terminal 301 are illustrated as a positive phase side and a negative phase side, respectively.

The switching part 34 includes a switch 341 and a switch 342. The switch 341 switches a connection point of the input terminal 300 between a terminal 343 and a terminal 346. Switching is executed by, for example, a control signal from the control part 10. The switch 342 switches a connection point of the input terminal 301 between a terminal 345 and a terminal 347. Similarly, switching is executed by a control signal from the control part 10. The terminal 343 and the terminal 345 are connected to an output terminal 348 and the terminal 346 and the terminal 347 are connected to an output terminal 349.

In a state where the input terminal 300 is connected to the terminal 343 by the switch 341 and the input terminal 301 is connected to the terminal 347 by the switch 342, a signal supplied to the input terminal 300 is output from the output terminal 348 and a signal supplied to the input terminal 301 is output from the output terminal 349. In response to a control signal, in a state where the input terminal 300 is connected to the terminal 346 by the switch 341 and the input terminal 301 is connected to the terminal 345 by the switch 342, a signal supplied to the input terminal 301 is output from the output terminal 348 and a signal supplied to the input terminal 300 is output from the output terminal 349. That is, it is possible for the switching part 34 to switch a signal that is supplied to the frequency divider 35.

The frequency divider 35 has a first D-type latch circuit 351 and a second D-type latch circuit 352. Output ends (Q, /Q) of the first D-type latch circuit 351 are connected to output ends (D, /D) of the second D-type latch circuit 352. The output end Q of the second D-type latch circuit 352 is connected to the input end /D of the first D-type latch circuit 351 and the output end /Q is connected to the input end D. A signal from the output terminal 348 of the switching part 34 is supplied to a clock input end CNK of the latch circuit 351 and a clock input end CKP of the latch circuit 352 and a signal from the output terminal 349 is supplied to a clock input end CKP of the latch circuit 351 and a clock input end CKN of the latch circuit 352.

Each of the latch circuits (351, 352) introduces signals that are supplied to the input ends (D, /D) at a time when a signal that is supplied to the clock input end CKP is at an H level, and an output of each of the latch circuits (351, 352) is held for a period of time when a signal that is supplied to the clock input end CKP is at an L level, therefore, a signal that is supplied to the clock input end CKN is at an H level. Due to such an operation, it is possible to divide a frequency of a signal that is supplied to the input terminals (300, 301) of the switching part 34, that is, a frequency of an output signal of the local oscillator 31, into ½.

Respective output signals of the frequency divider 35 are output as signals (IP, IN) from output terminals (353, 354) connected to the output ends (Q, /Q) of the first D-type latch circuit 351 and output as signals (QN, QP) from output terminals (355, 356) connected to the output ends (Q, /Q) of the second D-type latch circuit 352. Signals IP and IN that are output from the output terminals (353, 354) or signals QP and QN that are output from the output terminals (355, 356) have an inverse relationship therebetween. Furthermore, signals IP and QP or signals IN and QN have a relationship with a phase shift of 90 degrees. Therefore, for example, it is possible to use as a local signal for modulation that is supplied to the orthogonal modulator 14, and similarly, it is possible to use as a local signal for demodulation that is supplied to the orthogonal demodulator 24, a pair of a signal IP that is output from the output terminal 353 and a signal QP that is output from the output terminal 356 and a pair of a signal IN that is output from the output terminal 354 and a signal QN that is output from the output terminal 355. Additionally, it is possible to provide the frequency divider 32 that is connected to the orthogonal modulator 14 with a configuration that does not include the switching part 34.

A polarity of a signal that is supplied to the frequency divider 35 through the switching part 34 is switched, and thereby, it is possible to shift phases of signals (IP, IN, QP, QN) of such a frequency divider by 90 degrees. More specifically, signals (LOP, LON) that are supplied to the clock input ends (CKN, CKP) of the first D-type latch circuit 351 and the second D-type latch circuit 352 are switched, and thereby, it is possible to shift phases of signals (IP, IN, QP, QN) of a frequency divider by 90 degrees. It is because a time of introduction of an input signal of each of the latch circuits (351, 352) is shifted.

A situation where phases of signals (IP, IN, QP, QN) of the frequency divider 35 are shifted will be described by using waveform diagrams in FIG. 3A to FIG. 3C. FIG. 3A illustrates signals (LOP, LON) that are supplied to the input terminals (300, 301) of the switching part 34. Conveniently, a signal LON and a signal LOP are indicated by a solid line and a dotted line, respectively. Switching of a relation of connection between the input terminals (300, 301) and the output terminals (348, 349) of the switching part 34 is executed at a point P. After switching, a signal LOP is indicated by a solid line and a signal LON is indicated by a dotted line. In such an example, a switching time P is a time when a signal LON is in a negative state thereof. Therefore, a positive signal LOP is connected at a time when a signal LON is in a negative state thereof, and thereby, timing of introduction of a signal in each of the latch circuits (351, 352) is accelerated. Thereby, phases of signals (IP, IN, QP, QN) are advanced. A phase difference between signals (LON, LOP) that are supplied to the respective latch circuits (351, 352) is 180 degrees and frequencies of signals (IP, IN, QP, QN) of the frequency divider 35 are ½ of frequencies of signals (LON, LOP), so that a phase shift is 90 degrees.

FIG. 3B illustrates signals (IP, IN) of the frequency divider 35. Conveniently, a signal IN and a signal IP are indicated by a solid line and a dotted line, respectively. A signal IN in a case where switching has not been executed is indicated by a dashed-dotted line. Due to switching, a phase of a signal IN is advanced by 90 degrees. Additionally, a signal IP is a signal provided by inverting a signal IN, and hence, for explanation, only a signal IN is illustrated as a signal in a case where switching has not been executed.

FIG. 3C illustrates signals (QP, QN) of the frequency divider 35. Conveniently, a signal QP and a signal QN are indicated by a solid line and a dotted line, respectively. After switching of an input, it is also possible to advance a phase of a signal QP by 90 degrees, relative to a signal QP in a case where switching has not been executed (as indicated by a dashed-dotted line). Also in FIG. 3C, a signal QN is an inversion signal of a signal QP, and hence, only a signal QP is illustrated as a signal in a case where switching has not been executed.

In a case where phases of signals (IN, IP, QP, QN) are delayed by 90 degrees, control is to execute switching at a time when a signal LON is positive. Thereby, a time when a latch circuit introduces a signal is delayed by ½ of periods of signals (LON, LOP), so that it is possible to delay phases of signals (IN, IP, QP, QN) by 90 degrees.

In a configuration with the phase shift control part 33 according to the present embodiment, it is possible to shift phases of signals (IP, IN, QP, QN) of the frequency divider 35 by 90 degrees by only switching signals (LON, LOP) that are supplied to the frequency divider 35. Only switching of input signals (LON, LOP) is executed and signals that are supplied to the orthogonal demodulator 24 are signals (IP, IN, QP, QN) of the frequency divider 35 that are supplied directly thereto, so that an amplitude of a local signal that is supplied to the orthogonal demodulator 24 does not vary with a phase shift. An amplitude of a local signal that is supplied to the orthogonal demodulator 24 does not vary between before and after a phase shift, and hence, it is possible to improve accuracy of measurement of an orthogonal error.

For example, a state of a phase of an output signal of the local oscillator 31 is monitored and a time when input signals (LON, LOP) are switched is adjusted depending on whether an input signal LON that is supplied to the phase shift control part 33 is in a negative or positive state, so that it is possible to reliably execute control as to whether a phase is advanced or delayed by 90 degrees.

Additionally, as long as algorithm is provided in such a manner that a phase shift is applied to form two states, before the phase shift and after the phase shift, and reflect them in measurement of an orthogonal error, whether a phase is advanced or delayed by 90 degrees is not a major problem. That is, it is possible to provide algorithm in such a manner that an orthogonal error that is caused by the orthogonal modulator 14 is separated from that of the orthogonal demodulator 24 by a phase shift to execute correction of such an orthogonal error.

Figure 4A:
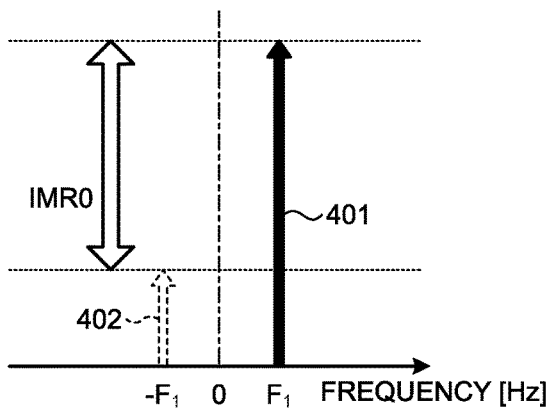
FIG. 4A to FIG. 4C are diagrams for illustrating a frequency characteristic deviation.
Figure 4B:
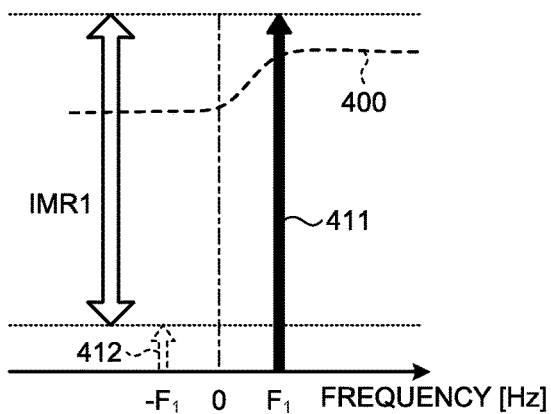
Figure 4C:
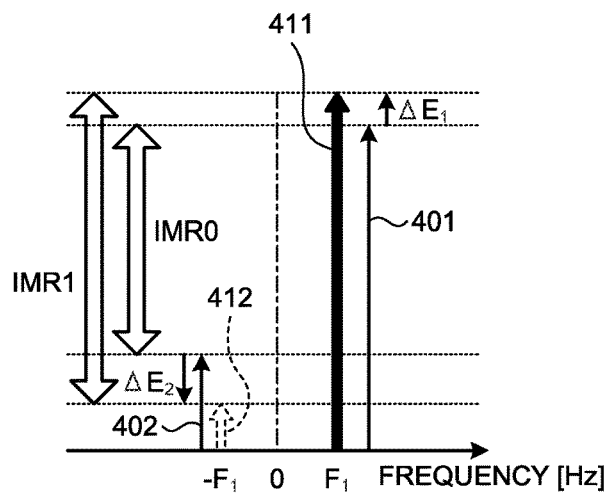

FIG. 4A to FIG. 4C are diagrams for conceptually illustrating an influence of a frequency characteristic deviation of the loop back path 360. If an orthogonal error is present, an image signal is generated in an output signal of the orthogonal modulator 14. In FIG. 4A, 401 denotes an original signal component and has, for example, a frequency that is higher than a local frequency by $F_1$. 402 denotes an image signal that is detected as a signal with a frequency that is lower than a frequency of a local signal by $F_1$. A difference between a signal component 401 and an image signal 402 is detected to set a suppression ratio (Image Rejection ratio (IRR)) of such an image signal in the orthogonal modulator 14. A suppression ratio IRR for suppressing an image signal that is generated by an orthogonal error of the orthogonal modulator 14, per se, is denoted by IMR0.

FIG. 4B illustrates a case where an output signal of the orthogonal modulator 14 is supplied to the orthogonal demodulator 24 through the loop back path 360 to execute measurement of an orthogonal error. Reference numeral 411 denotes an original signal component and Reference numeral 412 denotes an image signal component. Reference numeral 400 denotes a frequency characteristic deviation of the loop back path 360. For example, provided is an example of a case where a frequency characteristic deviation is illustrated in such a manner that a signal is expanded at a high-frequency side.

An influence of a frequency characteristic deviation of the loop back path 360 will be described conceptually by using FIG. 4C. In a case where the loop back path 360 has a frequency characteristic deviation where a signal component is expanded at a high-frequency side, detection is executed in a state where a signal component 401 with a frequency higher than that of a local signal increases by an error $\Delta E_1$ and an image signal component 402 is suppressed relative to an original image signal component 402 by $\Delta E_2$, as illustrated in FIG. 4C. That is, an output signal of the orthogonal modulator 14 is detected in a relationship as illustrated in FIG. 4B where a signal component 401 is expanded to provide a signal component 411 and an image signal component 402 is suppressed to provide a signal 412. In such a case, a suppression ratio IRR is IMR1. That is, an error is generated between an original suppression ratio IRM0 in the orthogonal modulator 14 and a suppression ratio IRM1 that is obtained through the loop back path 360.

Second Embodiment

Figure 5:
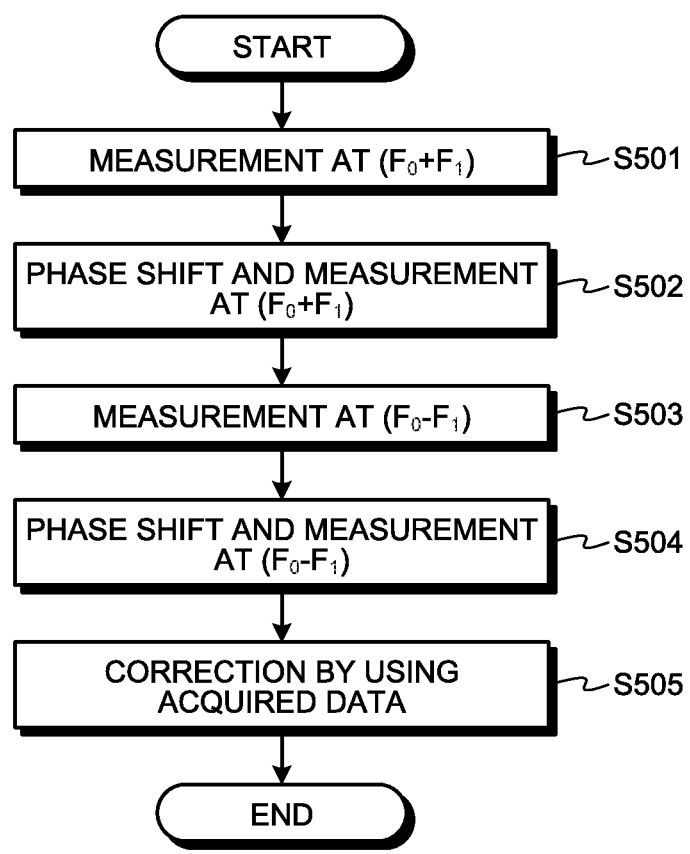
FIG. 5 is a diagram illustrating steps of an orthogonal error measurement method according to a second embodiment.

FIG. 5 illustrates an embodiment of a measurement method that is capable of improving accuracy of measurement of an orthogonal error even in a case where an output of the orthogonal modulator 14 is delivered to the orthogonal demodulator 24 through the loop back path 360 as has already been described.

In the present embodiment, measurement of an orthogonal error is executed in a state where the orthogonal modulator 14 outputs a test signal that has a frequency ($F_0+F_1$) that is higher than a frequency $F_0$ of a local signal by a frequency $F_1$ (S501). Then, measurement of an orthogonal error is executed while a phase of a local signal that is supplied to the orthogonal demodulator 24 is shifted by, for example, 90 degrees, in a state where the orthogonal modulator 14 outputs a test signal that has a frequency ($F_0+F_1$) that is higher than a frequency $F_0$ of a local signal by a frequency $F_1$ (S502). Then, measurement of an orthogonal error is executed in a state where a test signal that has a frequency ($F_0-F_1$) that is lower than a frequency $F_0$ of a local signal by a frequency $F_1$ is output as an output signal of the orthogonal modulator 14 (S503). Then, measurement of an orthogonal error is executed while a phase of a local signal that is supplied to the orthogonal demodulator 24 is shifted by, for example, 90 degrees, in a state where a test signal that has a frequency ($F_0-F_1$) that is lower than a frequency $F_0$ of a local signal by a frequency $F_1$ is output as an output signal of the orthogonal modulator 14 (S504). Additionally, a phase shift of 90 degrees is applied by the switching part 34 that switches a signal from the local oscillator 31 and supplies it to the frequency divider 35, in the embodiment of FIG. 1.

Correction of an orthogonal error is executed by using values of a test signal component and an image signal component that are acquired in each step (S501 to S504) (S505). That is, in measurement of an orthogonal error in a state where a test signal with ($F_0+F_1$) is output as an output signal of the orthogonal modulator 14, such a test signal component with ($F_0+F_1$) is an original signal component and a frequency ($F_0-F_1$) is used for an image signal component. Similarly, in measurement of an orthogonal error in a state where a test signal with ($F_0-F_1$) is output as an output signal of the orthogonal modulator 14, measurement is executed while a test signal component with a frequency ($F_0-F_1$) is an original signal component and ($F_0+F_1$) is provided for an image signal component. An orthogonal error is measured by providing a state where local signals that are supplied to the orthogonal modulator 14 and the orthogonal demodulator 24 are supplied in phase and a state where a phase shift is applied (S502, S504), and thereby, it is possible to separate and detect an error that is caused by the orthogonal modulator 14 and an error that is caused by the orthogonal demodulator 24.

In a case where a frequency characteristic deviation of the loop back path 360 is denoted by 400 in FIG. 4B, a test signal component is expanded at step (S501) and step (S502).

On the other hand, a test signal component is suppressed by a frequency characteristic deviation of the loop back path 360 at step (S503) and step (S504).

Therefore, a test signal component and an image signal component that are measured at each step are added and a difference therebetween is calculated, so that it is possible to cancel an influence of a frequency characteristic deviation of the loop back path 360. Thereby, it is possible to obtain a correction coefficient for an orthogonal error where an influence of a frequency characteristic deviation of the loop back path 360 is suppressed.

In a measurement method for an orthogonal error according to the present embodiment, a correction value for an orthogonal error is calculated by using a difference between a sum of original test signal components and a sum of image signal components at respective times of measurement of an orthogonal error. Thereby, it is possible to cancel influences of a frequency characteristic deviation of the loop back path 360 that are generated at a high-frequency side and a low-frequency side centered at a frequency $F_0$ of a local signal, and hence, it is possible to improve accuracy of measurement of an orthogonal error.

Additionally, it is possible to execute control to switch test signals with a frequency ($F_0+F_1$) and a frequency ($F_0-F_1$) and output them from the orthogonal modulator 14, by, for example, inverting a phase of a Q-phase that is supplied to the orthogonal modulator 14, that is, shifting such a phase by 180 degrees.

For example, a local signal that is supplied to the orthogonal modulator 14 is as follows.

$$\begin{cases} T_{XI}\_LO(t) = \cos(\omega_0 \cdot t) \\ T_{XQ}\_LO(t) = -\sin(\omega_0 \cdot t) \end{cases} \quad (1)$$

Herein, $T_{XI}\_LO(t)$ represents an I-phase component of a local signal and $T_{XQ}\_LO(t)$ represents a Q-phase component of such a local signal. A frequency of a local signal is $F_0$ and represented by an angular velocity $\omega_0$ ($=2\cdot\pi\cdot F_0$) in each formula.

An I-phase component $CW_I(t)$ and a Q-phase component $CW_Q(t)$ of a Continuous Wave (CW) test signal that is supplied to the orthogonal modulator 14 are as follows.

$$\begin{cases} CW_I(t) = A \cdot \cos(\omega_1 \cdot t) \\ CW_Q(t) = A \cdot \sin(\omega_1 \cdot t) \end{cases} \quad (2)$$

Herein, A represents an amplitude of a CW test signal that is supplied as a test signal. A frequency of a CW test signal is $F_1$ and represented by an angular velocity $\omega_1$ ($=2\cdot\pi\cdot F_1$) in each formula.

In the orthogonal modulator 14, an input CW test signal is multiplied by a local signal, and subsequently, I-phase and Q-phase signal components are added thereto, so that an output thereof is executed. Therefore, it is possible to represent an output signal $T_x(t)$ of the orthogonal modulator 14 by the following formula (3).

$$T_X(t) = T_{XI}\_LO(t) \cdot CW_I(t) + T_{XQ}\_LO(t) \cdot CW_Q(t) \quad (3)$$

$$= A \cdot \cos(\omega_0 \cdot t) \cdot \cos(\omega_1 \cdot t) - A \cdot \sin(\omega_0 \cdot t) \cdot \sin(\omega_1 \cdot t)$$

$$= \frac{A}{2} \cdot [\cos(\omega_0 - \omega_1) \cdot t + \cos(\omega_0 + \omega_1) \cdot t] - \frac{A}{2} \cdot$$

$$[\cos(\omega_0 - \omega_1) \cdot t - \cos(\omega_0 + \omega_1) \cdot t]$$

$$= A \cdot \cos(\omega_0 + \omega_1) \cdot t$$

That is, a frequency of an output signal $T_x(t)$ of the orthogonal modulator 14 is $(F_0+F_1)$. Such a test signal with a frequency $(F_0+F_1)$ is an upper sideband signal of an orthogonal modulation output signal of the orthogonal modulator 14 that is separated from a frequency $F_0$ of a local signal by $F_1$.

Then, as a phase of a Q-phase component of a CW test signal is shifted by 180 degrees or inverted, an I-phase component $CW_I(t)$ and a Q-phase component $CW_Q(t)$ of a CW test signal that is supplied to the orthogonal modulator 14 are as follows.

$$\begin{cases} CW_I(t) = A \cdot \cos(\omega_1 \cdot t) \\ CW_Q(t) = -A \cdot \sin(\omega_1 \cdot t) \end{cases} \quad (4)$$

If an I-phase and a Q-phase of a local signal remain original states thereof, it is possible to represent an output signal $T_X(t)$ from the orthogonal modulator 14 by the following formula (5).

$$T_X(t) = T_{XI}\_LO(t) \cdot CW_I(t) + T_{XQ}\_LO(t) \cdot CW_Q(t) \quad (5)$$

$$= A \cdot \cos(\omega_0 \cdot t) \cdot \cos(\omega_1 \cdot t) + A \cdot \sin(\omega_0 \cdot t) \cdot \sin(\omega_1 \cdot t)$$

$$= \frac{A}{2} \cdot [\cos(\omega_0 - \omega_1) \cdot t + \cos(\omega_0 + \omega_1) \cdot t] + \frac{A}{2} \cdot$$

$$[\cos(\omega_0 - \omega_1) \cdot t - \cos(\omega_0 + \omega_1) \cdot t]$$

$$= A \cdot \cos(\omega_0 + \omega_1) \cdot t$$

That is, it is possible for a frequency of an output signal $T_X(t)$ from the orthogonal modulator 14 to be $(F_0-F_1)$. Such a test signal with a frequency $(F_0-F_1)$ is a lower sideband signal of an orthogonal modulation output signal of the orthogonal modulator 14 that is separated from a frequency $F_0$ of a local signal by $F_1$.

In a measurement method for an orthogonal error according to the present embodiment, errors of a test signal component and an image signal component are canceled even in a case where a frequency characteristic deviation is present in the loop back path 360, and hence, influences of such a frequency characteristic deviation of the loop back path 360 are canceled, so that it is possible to improve accuracy of measurement of an orthogonal error.

Figure 6:
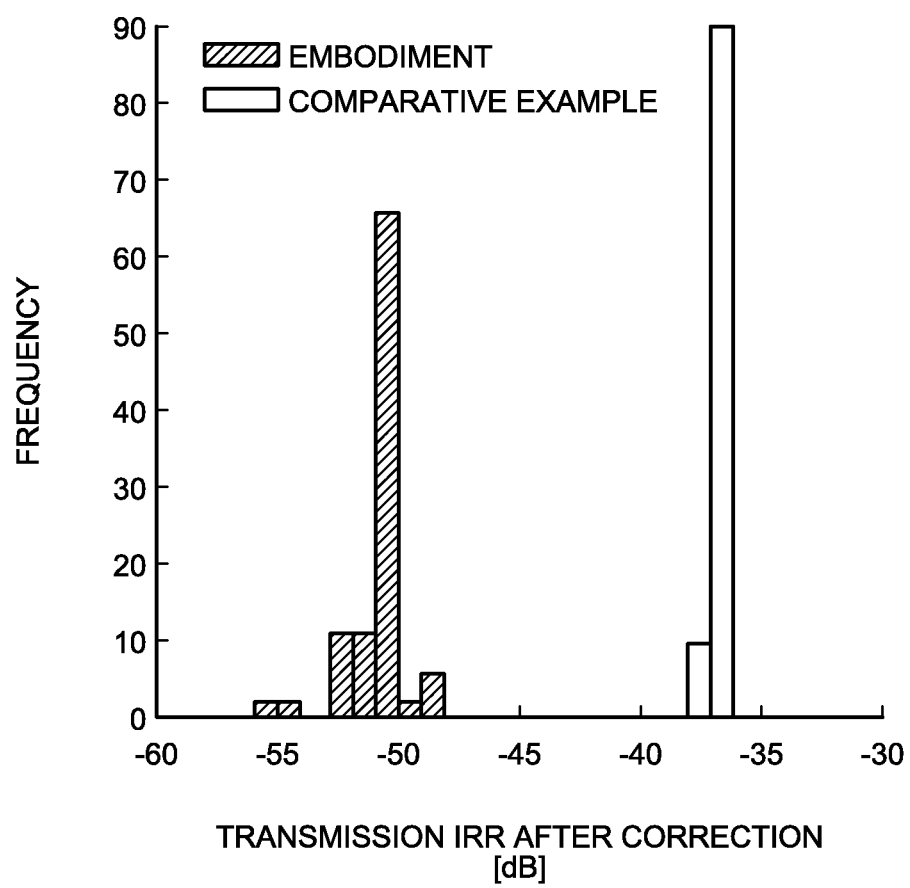
FIG. 6 is a diagram illustrating an effect of an orthogonal error measurement method according to a second embodiment.

FIG. 6 illustrates a result of simulation in a case where error correction is executed by using an orthogonal error measurement method according to the present embodiment. A horizontal axis and a vertical axis represent a transmission IRR of the orthogonal modulator 14 after correction is executed by using a measurement value obtained by measurement of an orthogonal error and a frequency of occurrence thereof, respectively. A frequency $F_0$ of a local signal is 5500 MHz, $F_1$ is 10 MHz, and a frequency characteristic deviation of the loop back path 360 is 2 dB/10 MHz. A hatched bar graph in FIG. 6 represents a result of simulation according to the present embodiment. It is possible to find that a transmission IRR of the orthogonal modulator 14 according to the present embodiment is greatly improved as compared with an example of a case where measurement of an orthogonal error and error correction are executed by using only one test signal with a frequency $(F_0+F_1)$ (comparative example).

For a frequency of a test signal that is output from the orthogonal modulator 14, a step may be provided in such a manner that, at first, a test signal with $(F_0-F_1)$ that is lower than a frequency $F_0$ of a local signal by a predetermined frequency $F_1$ is output, and subsequently, a test signal with $(F_0+F_1)$ that is higher than a frequency $F_0$ of such a local signal by $F_1$ is output. Similarly, influences of a frequency characteristic deviation of the loop back path 360 are canceled by using a total value of values of a test signal component and an image signal component that are measured at each frequency, so that it is possible to improve accuracy of measurement of an orthogonal error.

Measurement of an orthogonal error that is executed by switching a frequency of a test signal that is output by the orthogonal modulator 14 according to the present embodiment between a frequency $(F_0+F_1)$ and a frequency $(F_0-F_1)$ is executed, for example, for a period of time of a Short Interframe Space (SIFS) of Wi-Fi (registered trademark). Transmission/receiving of a signal is not executed for a period of time of an SIFS, and hence, it is possible to execute measurement of an orthogonal error by effectively utilizing such a period of time.

FIG. 7 illustrates a configuration example of a test signal pattern with a preamble for synchronization. I-phase and Q-phase signals are supplied to the orthogonal modulator 14. In a case where a frequency of a test signal that is output by the orthogonal modulator 14 is switched between $(F_0+F_1)$ and $(F_0-F_1)$, a phase of a Q-phase signal that is supplied to the orthogonal modulator 14 is shifted by 180 degrees, for example, for a period of time $T_2$ and a period of time $T_4$, as has already been described.

A Short Training Field (STF) signal of a wireless LAN, as a preamble signal for synchronization, is added for a period of time $(T_1, T_3)$ at a previous stage with respect to a period of time $(T_2, T_4)$ when a frequency of a test signal that is output from the orthogonal modulator 14 is switched between $(F_0+F_1)$ and $(F_0-F_1)$. For example, it is possible to provide a step in such a manner that a received signal pattern that corresponds to an STF is held in the synchronization part 22 as has already been described, a signal that indicates detecting of the synchronization part 22 at a time when a preamble signal that corresponds to an STF is detected is transmitted to the control signal 10, and subsequently, data needed for the orthogonal error estimation part 30 to measure an orthogonal error are acquired. A preamble signal is detected, and for example, information of a frequency of a test signal that is output from the orthogonal modulator 14 is acquired preliminarily, so that it is possible to improve accuracy of measurement of an orthogonal error.

A preamble signal for synchronization is not limited to an STF and any pattern may be used. A configuration of a test signal pattern that includes a preamble signal is generated by the transmission signal generation part 11.

At a time of measurement of an orthogonal error, for example, the amplifier 15 that is connected to the orthogonal modulator 14 and the amplifier 25 that supplies a signal to the orthogonal demodulator 24 are tuned off. Thereby, it is possible to prevent an unwanted signal from being delivered from the antenna 38. A signal that turns off the amplifiers (15, 25) is supplied from the control part 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device that includes a supply path that supplies an output signal of an orthogonal modulator to an orthogonal demodulator, and that includes a phase-shifting circuit that shifts a phase of a local signal to supply a phase shifted local signal to the orthogonal demodulator at a time of measurement of an orthogonal error, wherein the phase-shifting circuit includes:
    first and second signal input ends that are supplied with an output signal of a local oscillator between both ends thereof, the output signal of the local oscillator having a first phase and a second phase, wherein the first signal input end is supplied with the first phase of the output signal of the local oscillator and the second signal input end is supplied with the second phase of the output signal of the local oscillator;
    a frequency divider that has first and second input ends; and
    a switching part that is provided between the first and second signal input ends and the first and second input ends of the frequency divider and switches connection between the first and second signal input ends and the first and second input ends of the frequency divider.

2. The communication device according to claim 1, wherein the frequency divider includes a latch circuit that has an input end to receive an input signal, and that controls a time when the input signal is introduced, by signals that are supplied to the first and second input ends.

3. The communication device according to claim 2, wherein the latch circuit includes:
    a first latch circuit that controls a time when an input signal is introduced, by a signal that is supplied to the first input end; and
    a second latch circuit that is supplied with an output signal of the first latch circuit and controls a time when an output signal of the first latch circuit is introduced, by a signal that is supplied to the second input end.

4. The communication device according to claim 3, wherein:
    the first latch circuit outputs a first non-inverted output signal and a first inverted output signal;
    the second latch circuit outputs a second non-inverted output signal and a second inverted output signal; and
    the first non-inverted output signal and the first inverted output signal of the first latch circuit and the second non-inverted output signal and the second inverted output signal of the second latch circuit are supplied to the orthogonal demodulator.

5. The communication device according to claim 1, further including a following:
    a transmission signal generation part that supplies a test signal with a predetermined pattern to the orthogonal modulator in such a manner that a first test signal that has a frequency higher than a frequency provided by dividing a frequency of an output signal of the local oscillator in the frequency divider, by a predetermined frequency, and a second test signal that has a frequency lower than a frequency provided by dividing a frequency of an output signal of the local oscillator in the frequency divider, by the predetermined frequency, are output from the orthogonal modulator at different times at a time of measurement of the orthogonal error.

6. The communication device according to claim 5, wherein:
    the test signal with the predetermined pattern that is generated by the transmission signal generation part includes a preamble signal for synchronization; and
    the communication device further includes a synchronization part that detects the preamble signal for synchronization.

7. The communication device according to claim 6, wherein the transmission signal generation part supplies the preamble signal for a first period of time that is prior to a first time when the first test signal is output and for a second period of time that is prior to a second time when the second test signal is output.

8. The communication device according to claim 1, wherein the phase-shifting circuit delays a phase of the local signal or advances the phase, depending on a phase of an output signal of the local oscillator that is supplied to the first and second signal input ends, and supplies it to the orthogonal demodulator.

9. The communication device according to claim 1, further including:
    an amplifier that amplifies the output signal of the orthogonal modulator; and
    a control circuit that controls an operation of the amplifier, wherein
    the control circuit turns off the operation of the amplifier at a time of measurement of the orthogonal error.

10. The communication device according to claim 9, wherein the control circuit executes control to switch connection between the first and second signal input ends of the switching part and the first and second input ends of the frequency divider at a time of measurement of the orthogonal error.

11. A communication device, comprising: an orthogonal modulator;
    an amplifier that amplifies an output signal of the orthogonal modulator and supplies it to an output end;
    a local oscillator;
    a first frequency divider that divides a frequency of an output of the local oscillator and supplies it to the orthogonal modulator;
    an orthogonal demodulator;
    a supply path that supplies the output signal of the orthogonal modulator to the orthogonal demodulator;
    a second frequency divider that divides the frequency of the output of the local oscillator and supplies it to the orthogonal demodulator;
    a switching part that is provided between the local oscillator and the second frequency divider, switches a phase of the output of the local oscillator, and supplies it to the second frequency divider; and
    a control circuit that controls a conduction state of the supply path and that controls switching of the switching part.

12. The communication device according to claim 11, wherein the control circuit turns off an operation of the amplifier at a time of measurement of the orthogonal error.

13. The communication device according to claim 12, wherein the control circuit causes the supply path to be conductive and controls the switching part to switch the phase of the output of the local oscillator and supply it to the second frequency divider, at a time of measurement of the orthogonal error.

14. The communication device according to claim 13, wherein the second frequency divider shifts a phase of a signal provided by dividing the frequency of the output of the local oscillator depending on the phase of the output of the local oscillator that is supplied to the switching part, and supplies it to the orthogonal demodulator.

15. An orthogonal error measurement method for a communication device that supplies a local signal to an orthogonal modulator, and that supplies a local signal with a phase shifted relative to that of the local signal that is supplied to the orthogonal modulator, and that supplies an output signal of the orthogonal modulator to the orthogonal demodulator to measure an orthogonal error, wherein the orthogonal error measurement method includes a following:

supplying a first test signal with a frequency that is higher than a frequency of the local signal by a predetermined frequency to the orthogonal demodulator for a first period of time to measure a signal component of the first test signal and an image signal component of the first test signal in an output signal of the orthogonal demodulator;

shifting a phase of the local signal in a state where the first test signal is supplied to the orthogonal demodulator and supplying it to the orthogonal demodulator, for a second period of time, to measure a signal component of the first test signal and an image signal component of the first test signal in an output signal of the orthogonal demodulator;

supplying a second test signal with a frequency that is lower than the frequency of the local signal by the predetermined frequency to the orthogonal demodulator for a third period of time to measure a signal component of the second test signal and an image signal component of the second test signal in an output signal of the orthogonal demodulator;

shifting a phase of the local signal in a state where the second test signal is supplied to the orthogonal demodulator and supplying it to the orthogonal demodulator, for a fourth period of time, to measure a signal component of the second test signal and the image signal component of the second test signal in an output signal of the orthogonal demodulator; and obtaining a correction coefficient for an orthogonal error from measurement values of signal components of the first and second test signals and image signal components of the first and the second test signals that are measured for the first to fourth periods of time.

16. The orthogonal error measurement method for a communication device according to claim 15, further comprising a following:

delivering a synchronization signal with a predetermined pattern prior to the first and second test signals.

17. The orthogonal error measurement method for a communication device according to claim 15, wherein the obtaining a correction coefficient for an orthogonal error includes calculating a difference between a sum of signal components of the first and second test signals and a sum of the image signal components of the first and the second test signals that are measured for the first to fourth periods of time.

18. The orthogonal error measurement method for a communication device according to claim 15, wherein:

the supplying, to an orthogonal demodulator, a local signal with a phase shifted relative to that of a local signal that is supplied to the orthogonal modulator includes dividing a frequency of an output signal of a local oscillator in a frequency divider and supplying it to the orthogonal demodulator; and the shifting a phase of the local signal for the second period of time and the fourth period of time includes inverting a phase of the output signal of the local oscillator and supplying it to the frequency divider.

19. The orthogonal error measurement method for a communication device according to claim 15, wherein:

the shifting a phase of the local signal for the second period of time includes shifting a phase of the local signal by 90 degrees; and the shifting a phase of the local signal for the fourth period of time includes shifting a phase of the local signal by 90 degrees.

20. The orthogonal error measurement method for a communication device according to claim 15, wherein the supplying the first test signal and the second test signal includes inverting a phase of a Q-phase component of a non-modulated continuous wave test signal that is supplied to the orthogonal modulator.

* * * * *